June 25, 1963  B. POMPER  3,095,462

PLATE COLUMNS

Filed March 22, 1960

INVENTOR.
BORIS POMPER

BY Morgan, Finnegan, Durham & Pine
ATTORNEYS

United States Patent Office 3,095,462
Patented June 25, 1963

3,095,462
PLATE COLUMNS
Boris Pomper, Paris, France, assignor to The British Petroleum Company Limited, London, England, a British joint-stock corporation
Filed Mar. 22, 1960, Ser. No. 16,796
Claims priority, application France Mar. 25, 1959
11 Claims. (Cl. 261—113)

This invention relates to plate columns for efficiently contacting liquid and vapour phases.

Plate columns, for example distillation columns, of the usual type have horizontal bubble-cap plates. In such a column, the level of the liquid phase on the tray impedes the rising vapours and thus acts against complete interpenetration of the phases.

Columns with horizontal perforated plates having holes of equal diameter are known in which the liquid phase passes in a downward direction and the vapour phase in an upward direction. Such a system gives better interpenetration of the phases than the usual bubble-cap plates but the passage of the phases is nonetheless impeded so that sufficiently uniform results can only be obtained within narrow operating limits. Moreover, such an installation is susceptible to corrosion and to the deposition of rust and sediments which cause choking, so that it is difficult to avoid the liquid or vapour phase passing through preferentially with consequent irregularity of performance.

According to the present invention, an improved liquid-vapour contacting column contains superimposed, perforated plates, alternately inclined in opposite directions, each providing a large overflow at its upper edge. The perforations progressively decrease in size from the upper part to the lower part of the plates. The term large as applied to the overflows means larger than this largest perforation.

The size of the overflows is preferably not more than a fifth and not less than a thirtieth of the total cross-section of the column and may conveniently be about one tenth of the total cross-section of the column. The perforations in the plates are preferably, but not necessarily, circular. The perforations may vary in diameter between 1 mm.–40 mm. (0.04 in.–1.57 in.) in the case of circular perforations and in the case of non-circular perforations the smallest dimension of the perforation may vary between 1 mm.–40 mm. (.04 in.–1.57 in.) The plates are preferably in two parts, the lower parts being more steeply inclined than the upper part. The plates, or in the case of two-part plates, the upper part of the plates may be inclined at an angle of up to 3° in a column of large diameter and up to 30° in a column of small diameter.

In this manner practically uniform downward passage of the liquid phase is obtained since the greatest supply of liquid corresponds with the apertures of smallest diameter. The vapour phase follows a curved path rising with increased velocity from below one plate to below the next highest plate through the open space between the overflow of each plate and the casing of the column, and through the spray formed by the liquid phase.

The invention is illustrated with reference to the accompanying drawings.

Figure 1:
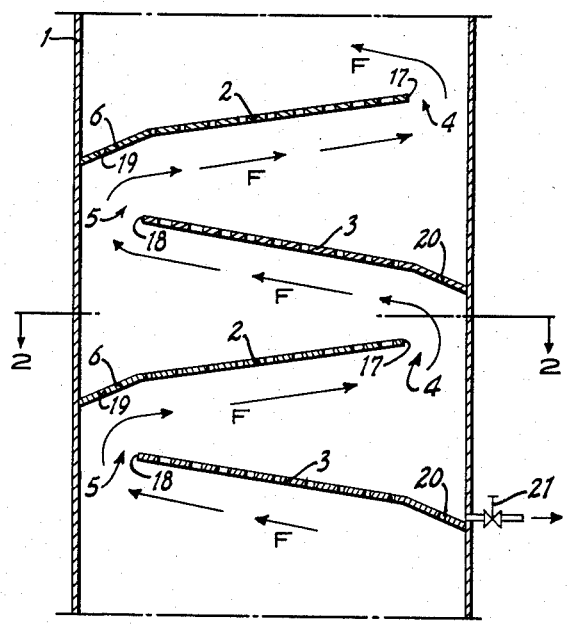
FIG. 1 is a partial section on an axial, vertical plane of a plate column according to the invention.

In FIG. 1 the column 1 contains similar, superimposed plates 2 and 3 which are inclined respectively towards the left and towards the right and which leave free spaces 4 and 5 between their upper edges and the casing of the column. Each plate has an upper part 17 or 18 and a lower part 6 or 7, the lower part having a greater inclination than the corresponding upper part. The lower parts 6 and 7 have weep-holes 19 and 20. 21 denotes a valve for a draw-off pipe. The vapour path is indicated by curved line F.

Figure 2:
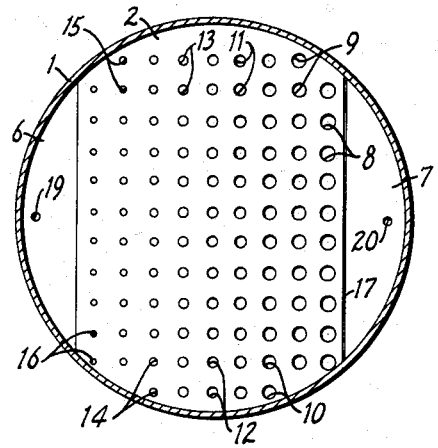
FIG. 2 is a plan view of a plate on the line II—II of FIG. 1.

In FIG. 2, a plate 2 has rows of apertures 8, 9, 10, 11, 12, 13, 14, 15, 16 arranged in parallel on the upper part 17, of the plate. The diameters of these apertures decrease as they approach the lower part 6 of the plate. The lower part 6 of the plate has a single aperture 19.

The plates may be attached to the inner wall of the column in any known manner and if required, draw-off pipes may be situated at any suitable point.

The disposition of the plates in the column according to the invention ensures good distribution of the trickling liquid phase under each plate due to the fact that the load of liquid phase is greater the smaller the diameter of the holes. Any excess of liquid may run off at the upper edges of plates 2 and 3 by way of overflow, and the passages 4 and 5 of the overflows are designed large with respect to the perforations, for example they may occupy up to an eighth and conveniently about a tenth of the total cross-section of the column. The result is an accelerated passage of the vapour phase under each plate through the trickling liquid phase and in this way an intimate and very rapid mixing of the liquid and vapour phases is obtained which provides an increased yield compared with known installations.

Moreover, excessive entrainment of liquid by the vapours is avoided and the column offers the advantage of a simple, relatively inexpensive construction which is easy to maintain. A column according to the present invention is suitable for the usual contacting operations for example: fractionation, degasification, purification, washing or cooling gases and can be operated under pressure, under vacuum or at atmospheric pressure.

It should be understood that the invention is not limited by the example given and that the invention may be carried out by way of various embodiments.

Details of design such as the angle of inclination of the plates and the sizes of the perforations will depend on the form of operation required, and optimum figures can readily be determined by experiment. In practice it is advisable to take account of the conditions in each particular case and particularly of the viscosity of the liquids treated by providing apertures of suitable sizes. The superimposed plates may also be provided with perforations adapted to the variations of viscosity of the liquid being treated. The described apparatus may also comprise other modifications known to the experts in the field, as well as improvements and additions without thereby departing from the character of the invention as it has been defined. The operation of these columns is identical with that of ordinary columns, and a column according to the present invention may include such features as a reflux section, vaporising section, stripping section and a reboiler.

I claim:

1. An improved liquid-vapour contacting column which comprises a casing and a series of superimposed plates, said plates being alternately inclined in opposite directions and secured to said casing at their lower ends, each plate having an overflow space between its upper edge and the casing of the column and each plate having a series of perforations, said perforations progressively decreasing in size down the plate so that when said column is in operation, the smallest perforations correspond to the greatest liquid depth, the rate of said progressive decrease in size of said perforations being such, in relation to the angle of inclination of the plate portion in which they are formed, that a substantially uniform flow of liquid through said perforations is maintained over the submerged portion of said plates.

2. A column as claimed in claim 1 in which the perforations in the plates are circular, and the diameter of the said perforations varies between 1 mm.–40 mm. (0.04 in.–1.57 in.).

3. A column as claimed in claim 1 in which the plates are inclined at an angle of up to 30° to the horizontal.

4. A column as claimed in claim 1 in which the plates are inclined at an angle of up to 3° to the horizontal.

5. A column as claimed in claim 1 in which the smallest dimension of the perforations varies between 1 mm.–40 mm. (0.04 in.–1.57 in.).

6. A column as claimed in claim 1 in which the overflow space occupies between one thirtieth and one fifth of the total cross-section of the column.

7. A column as claimed in claim 1 in which the overflow space occupies about one tenth of the total cross-section of the column.

8. A column as claimed in claim 1 in which each plate is divided into an upper part and a lower part, said lower part being more steeply inclined than said upper part.

9. A column as claimed in claim 8 in which the upper parts of the plates are inclined at an angle of up to 30° to the horizontal.

10. A column as claimed in claim 8 in which the upper parts of the plates are inclined at an angle of up to 3° to the horizontal.

11. An improved liquid-vapour contacting column which comprises, in combination, a casing and a series of superimposed plates, said plates being alternately inclined in opposite directions at an angle of up to 30° to the horizontal, each plate having an overflow space between its upper edge and the casing of the column, said overflow space occupying between one-thirtieth and one-fifth of the total cross-section of the column, and each plate having a series of perforations, said perforations progressively decreasing in size down the plate with the smallest dimension of the perforations varying between 1 mm.–40 mm. (0.04 in.–1.57 in.), the rate of said progressive decrease in size of said perforations being such, in relation to the angle of inclination of the plate portion in which they are formed, that a substantially uniform flow of liquid through said perforations is maintained over the submerged portion of said plates.

References Cited in the file of this patent

UNITED STATES PATENTS

| | | |
|---|---|---|
| 1,738,543 | Travers | Dec. 10, 1929 |
| 2,117,033 | Lyons | May 10, 1938 |
| 2,508,394 | John | May 23, 1950 |
| 2,747,849 | Colburn et al. | May 29, 1956 |
| 2,803,528 | Erdmann | Aug. 20, 1957 |
| 2,936,548 | Morrison | May 17, 1960 |
| 2,973,189 | Chu | Feb. 28, 1961 |

FOREIGN PATENTS

| | | |
|---|---|---|
| 744,183 | Germany | Jan. 12, 1944 |